Oct. 21, 1924.　　　　　　　　　　　　　　　1,512,524
G. DANNENBERG
INCUBATOR
Filed Dec. 11, 1923　　　　3 Sheets-Sheet 1
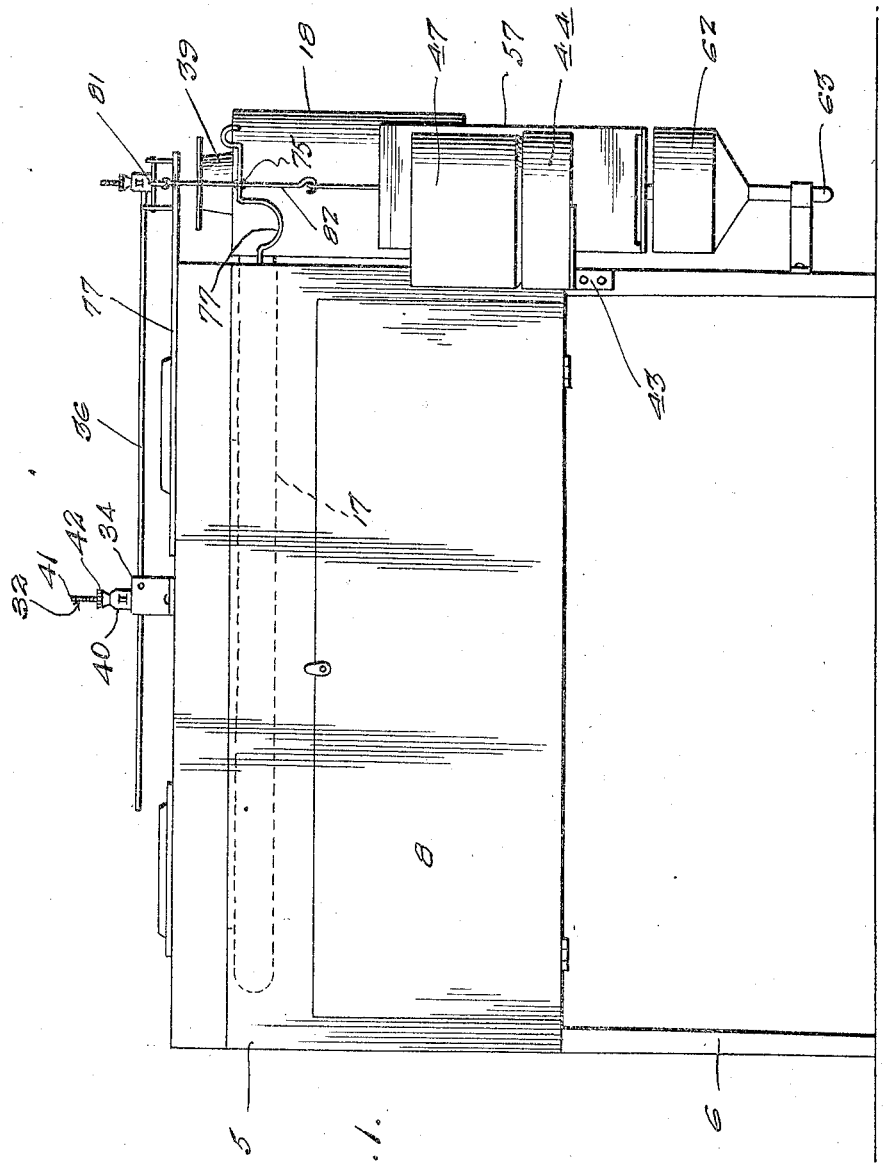
Witnesses:　　　　　　　　　　　　　Inventor
　　　　　　　　　　　　　　　　　　G. Dannenberg
　　　　　　　　　　　　　　By
　　　　　　　　　　　　　　　　　　　　Attorney Oct. 21, 1924. 1,512,524
G. DANNENBERG
INCUBATOR
Filed Dec. 11, 1923 3 Sheets-Sheet 2
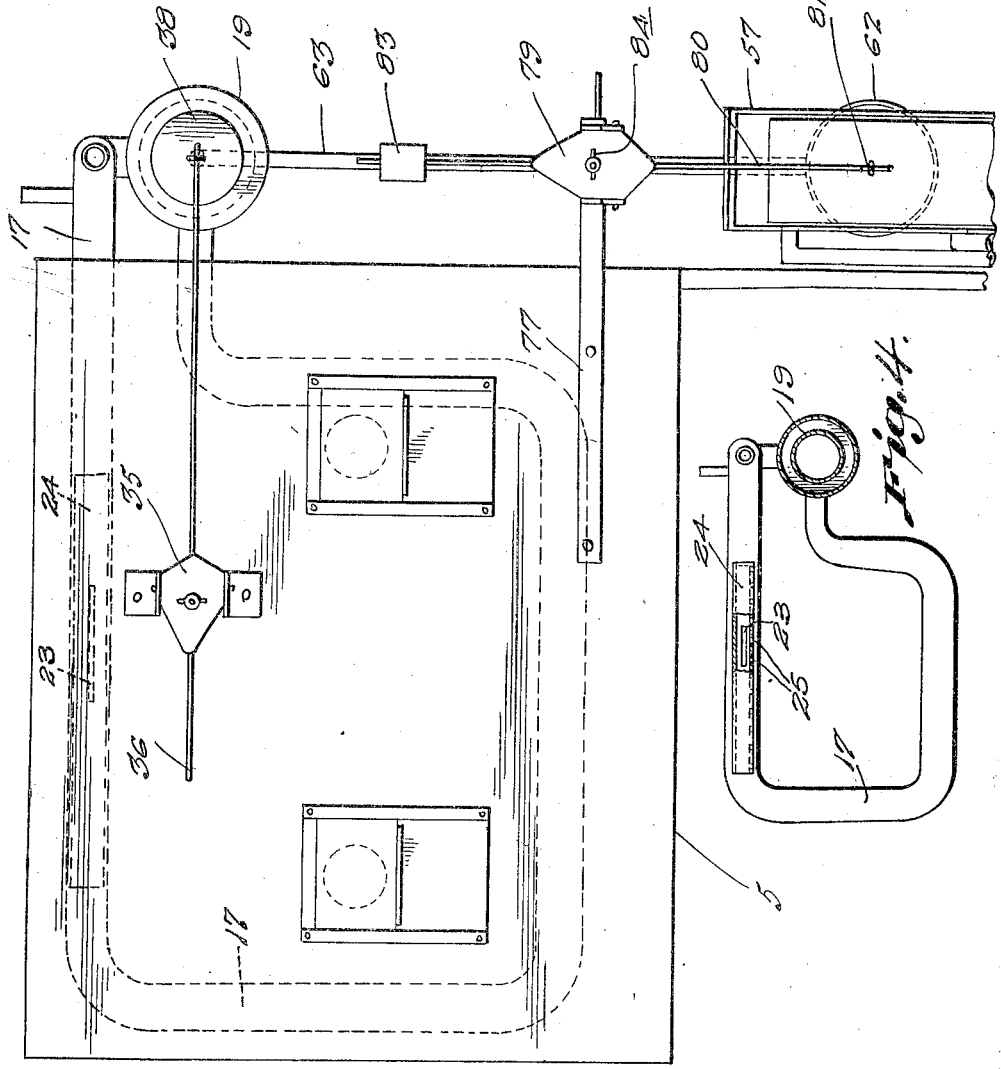

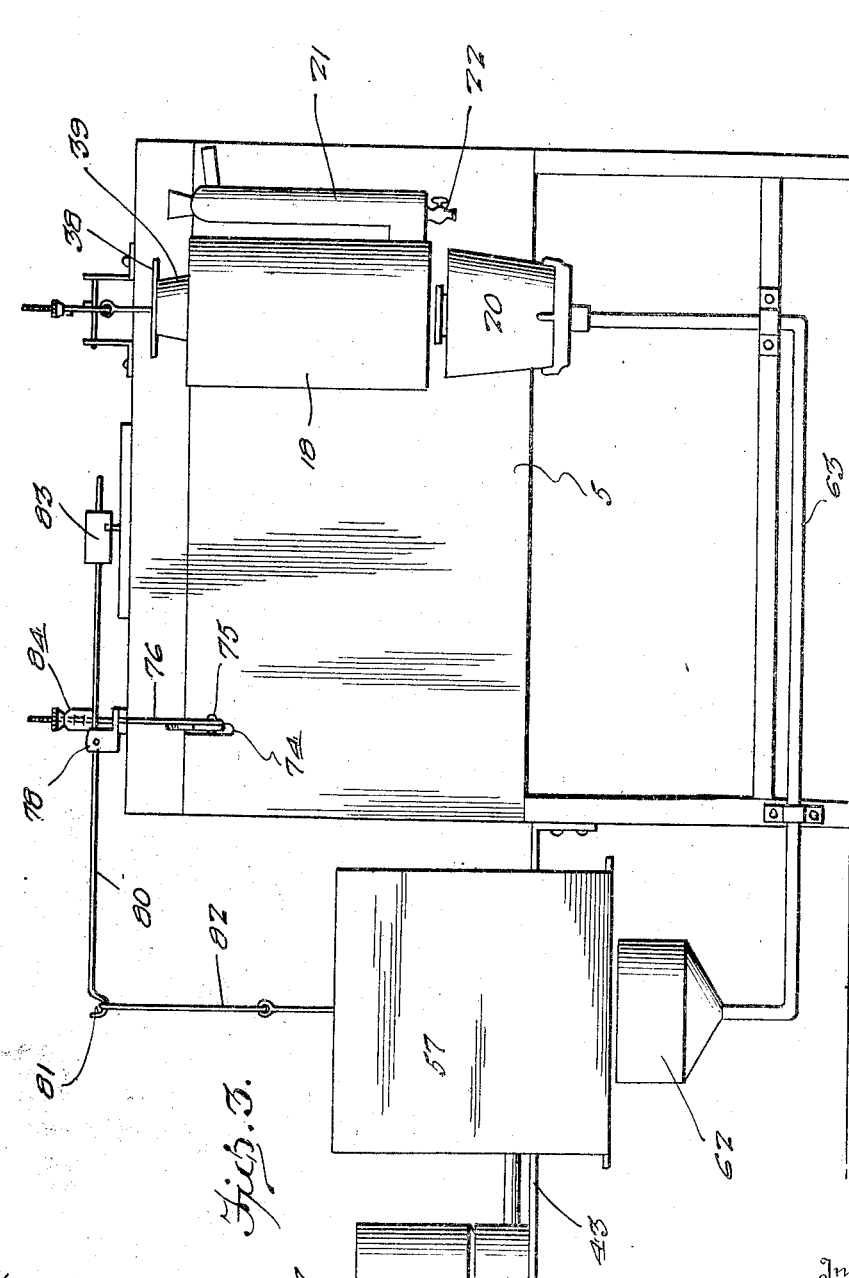

Patented Oct. 21, 1924.

1,512,524

UNITED STATES PATENT OFFICE.

GEORGE DANNENBERG, OF HUBBARD, IOWA.

INCUBATOR.

Application filed December 11, 1923. Serial No. 679,949.

*To all whom it may concern:*

Be it known that I, GEORGE DANNENBERG, a citizen of the United States, residing at Hubbard, in the county of Hardin and State of Iowa, have invented certain new and useful Improvements in Incubators, of which the following is a specification.

This invention relates to new and useful improvements in incubators and has for its primary object the provision of such a device wherein the same may be maintained at all times and this entirely automatically at a uniform temperature.

A further object of the invention resides in the provision of an incubator wherein the interior of the same is heated by a supply of steam, this steam being generated by an extremely simple and inexpensive mechanism, automatic means being provided for regulating the fuel to the steam generating burner for thereby allowing of the operation of the device at a minimum cost.

With the above salient objects in view and others that will become apparent as the nature of the invention is better understood, the same comprises the novel form, combination and arrangement of parts hereinafter more fully described, shown in the accompanying drawings and claimed.

In the drawings wherein like reference characters indicate corresponding parts throughout the different views, Figure 1 is an elevational view of one side of an incubator constructed in accordance with the present invention, Figure 2 is a top plan view thereof, Figure 3 is an elevational view of one end of the present incubator and with which is connected the steam generating mechanism, the automatic fuel feed mechanism, and the fuel supply.

Figure 4 is a top plan view partly in cross section of the steam pipe of the present invention.

Now having particular reference to the drawings, my novel incubator comprises a substantially rectangular shaped casing 5 supported above the ground or floor level through the medium of legs 6. One side of the casing 5 is provided with an opening for permitting the insertion and removal of the eggs from inside of the casing in a well known manner, and is closed by a suitable door 8, hinged to the lower portion of the casing.

The heating system for the incubator comprises a somewhat rectangular shaped steam pipe 17 that is located inside of the casing directly beneath the top wall thereof and in a substantially horizontal position as shown by the dotted lines in Figure 1. Suitably supported upon the outside of the casing 5 and preferably at the right hand end thereof as per Figures 1 and 3 is a drum shaped water receptacle 18 that is formed centrally with a vertical passage 19 directly beneath which is a suitable form of oil burner 20. The ends of said substantially rectangular shaped steam pipe 17 pass outwardly through the end wall of the receptacle, one end of this pipe being formed at a point outwardly of the casing with a downwardly extending branch pipe 21 that has communication with said water tank 18, the connection between said tank and branch pipe 21 being equipped with a pet cock 22 whereby the water may be properly drained when desired. The other end of the pipe 17 communicates with the water tank 18 directly at the upper end thereof whereby the steam that is generated within the tank 18 will pass outwardly thereof into the steam pipe 17 and circulate therethrough. This pipe 17 is formed at an appropriate point thereon with an elongated slot 23 over which is formed a housing 24 the inner longitudinal wall thereof being formed with a desirable number of openings 25 whereby a supply of the steam will be allowed to enter the casing supplying moisture to the heated air therein.

A suitable form of thermostat is mounted within the casing 5, which includes a rod 32, operable by said thermostat, which extends through an opening in the top of the casing, as shown in Figure 1. Positioned over the opening in said top wall of the casing is a U-shaped bracket 34 the bottom of which is formed with an opening that registers with the opening in the top wall of the casing and through which said rod 32 extends. Pivotally disposed within said U-shaped bracket 34 is an angular shaped plate 35 to the underside of which is secured a rod 36 that extends at one end beyond the end of the casing and is formed with a hook 37 with which is detachably associated a circular shaped damper plate 38 that hangs in a position directly above a skirt 39 that is a continuation of the passage 19 through the drum-shaped water tank 18.

Arranged vertically upon the angular shaped plate 35 at a point rearwardly of its pivotal connection to said U-shaped bracket 34 is a leg 40 of sheet metal formed with alined struck out eyes through which extends the rod 32 the upper end of this rod being screw-threaded as at 41 and upon which is arranged a thumb nut 42 for adjustment purposes. From the above description, it will be readily understood that upon the operation of the thermostat within the casing in a well known manner, for operating the rod 32, in an axial direction, the rod 36 will be rocked upon its pivot, due to an increase of heat within the casing, for raising the damper plate 38, away from the upper end of the passage 19, in the water receptacle for thereby allowing the heat trapped in the passage to pass outwardly therethrough lessening the degree of heat applied to the water tank for lessening the amount of steam generation and eventually lowering the temperature within the casing 5.

The fuel supply tank 47 is mounted in a pan 44, supported on the bracket 43 extending from one side of the incubator, and is provided with a suitable pipe connection to a fuel feed controlling device 57 adapted to control the amount of fuel passed to the funnel shaped member 62, for passing therethrough into the pipe 63 and through the burner 20. For effecting control of the fuel feed mechanism in the casing 57, a thermostatic device of any usual and well known construction is mounted within the casing 5, for operating the rod 77 projecting through one end of the casing 5, as illustrated in Figure 1. The outer end of rod 77 carries a vertically extending rod 76, which is pivotally connected thereto at 75, for operating a horizontal pivoted rod member 80 carried by the plate 79. The plate 79 is pivotally mounted in a suitable bracket 77, and an adjusting device 84 is operable to vary the position of the rod 80, with respect to the thermostat, in a well known manner. One end of the rod is provided with a hook 81, with which is connected a link 82, extending into the casing 57, for operating the controlling mechanism therein, for controlling the feed of oil from the tank 27 to the burner 20. A counter-weight 83 is mounted on the opposite end of the rod 80, which normally operates to rock the same about its pivot in the bracket 77, for co-operation with the thermostat in the controlling of the oil feeding device, in the casing 57. From this construction, it will thus be seen that a novel mechanism has been provided for controlling the feed of oil to the burner 20, which co-operates with the thermostatic mechanism for controlling the damper plate 38, in order that the degree of heat within the casing 5, may be automatically controlled, for maintaining a substantially even temperature at all times.

It will thus be seen that I have provided a highly novel and efficient form of incubator and one wherein the temperature within the incubator will be maintained at all times uniformly, and this by heat generating mechanism wherein but a minimum amount of fuel is used.

Although I have herein set forth an incubator consisting of certain specific structural elements it is nevertheless to be understood that I do not wish to limit myself to such a showing but in the future development of the invention minor changes may be made therein without departing from the spirit and scope of the appended claim.

Having thus described my invention, what I claim as new and desire to secure by Letters Patent is:—

In an incubator of the character described, a casing, a heating system for the interior of the casing and including a steam pipe disposed within the casing, a water tank communicating with the steam pipe, an oil burner supported beneath said water tank, an oil supply for the burner, automatic means for controlling the amount of steam generated, said means comprising a temperature controlled oil feed for the oil burner and a temperature controlled heat regulating device for regulating the degree of heat to which the water tank is subjected.

In testimony whereof I affix my signature.

GEORGE DANNENBERG.